US010568335B2

(12) United States Patent
Ur-Rehman et al.

(10) Patent No.: US 10,568,335 B2
(45) Date of Patent: Feb. 25, 2020

(54) FRACTIONATING MILK AND UHT STERILIZATION OF MILK FRACTIONS

(71) Applicant: fairlife, LLC, Chicago, IL (US)

(72) Inventors: Shakeel Ur-Rehman, Naperville, IL (US); Brandon Kopesky, Chicago, IL (US); Scott Backinoff, La Grange, IL (US); Timothy Peter Doelman, Glencoe, IL (US); Calvin White, Chicago, IL (US)

(73) Assignee: fairlife, LLC, Chicago, IL (US)

( * ) Notice: Subject to any disclaimer, the term of this patent is extended or adjusted under 35 U.S.C. 154(b) by 329 days.

(21) Appl. No.: 15/446,032

(22) Filed: Mar. 1, 2017

(65) Prior Publication Data

US 2017/0251683 A1    Sep. 7, 2017

Related U.S. Application Data

(60) Provisional application No. 62/302,843, filed on Mar. 3, 2016.

(51) Int. Cl.
| | | |
|---|---|---|
| *A23C 3/02* | (2006.01) | |
| *A23C 3/033* | (2006.01) | |
| *A23C 9/15* | (2006.01) | |
| *A23C 3/00* | (2006.01) | |
| *A23L 5/20* | (2016.01) | |
| *A23C 9/142* | (2006.01) | |
| *A23C 9/152* | (2006.01) | |

(52) U.S. Cl.
CPC ............ *A23C 3/02* (2013.01); *A23C 3/00* (2013.01); *A23C 3/033* (2013.01); *A23C 9/1422* (2013.01); *A23C 9/15* (2013.01); *A23C 9/152* (2013.01); *A23C 9/1522* (2013.01); *A23C 9/1526* (2013.01); *A23L 5/21* (2016.08); *A23V 2002/00* (2013.01)

(58) Field of Classification Search
CPC .. A23C 3/02; A23C 3/00; A23C 3/033; A23C 9/1422; A23C 9/15; A23C 9/152; A23C 9/1522; A23C 9/1526; A23L 5/21; A23V 2002/00
USPC ........ 426/580, 583, 587, 522, 478, 490, 491
See application file for complete search history.

(56) References Cited

U.S. PATENT DOCUMENTS

| | | |
|---|---|---|
| 6,881,428 B2 | 4/2005 | Lange |
| 7,169,428 B2 | 1/2007 | Dunker et al. |
| 7,829,130 B2 | 11/2010 | Tossavainen et al. |
| 9,510,606 B2 | 12/2016 | Ur-Rehman et al. |
| 9,538,770 B2 | 1/2017 | Ur-Rehman et al. |
| 10,271,563 B2 * | 4/2019 | Doring ..................... A23L 5/21 |
| 2007/0166447 A1 | 7/2007 | Ur-Rehman et al. |
| 2008/0286410 A1 | 11/2008 | Richmond et al. |
| 2010/0215828 A1 | 8/2010 | Tossavainen et al. |
| 2010/0297294 A1 | 11/2010 | Ur-Rehman et al. |
| 2010/0303958 A1 | 12/2010 | Ur-Rehman et al. |
| 2011/0117243 A1 | 5/2011 | Ur-Rehman et al. |
| 2011/0206806 A1 | 8/2011 | Ur-Rehman et al. |
| 2012/0015082 A1 | 1/2012 | Holst et al. |
| 2013/0309353 A1 | 11/2013 | Ur-Rehman et al. |
| 2013/0309354 A1 | 11/2013 | Ur-Rehman et al. |
| 2014/0113043 A1 | 4/2014 | Ur-Rehman et al. |

FOREIGN PATENT DOCUMENTS

| | | |
|---|---|---|
| WO | WO 2014/095543 | 6/2014 |
| WO | WO 2015/079108 | 6/2015 |

OTHER PUBLICATIONS

International Search Report and the Written Opinion of the International Searching Authority in PCT/US2017/020202 dated Jun. 6, 2017, 13 pages.

* cited by examiner

*Primary Examiner* — Leslie A Wong
(74) *Attorney, Agent, or Firm* — Merchant & Gould P.C.

(57) ABSTRACT

Disclosed are processes for reducing the cooked flavor, sulfur odor, and brown color of milk products that have been subjected to ultra-high temperature (UHT) sterilization via the UHT sterilization of certain milk fractions separately.

16 Claims, No Drawings

FRACTIONATING MILK AND UHT STERILIZATION OF MILK FRACTIONS

REFERENCE TO RELATED APPLICATION

This application claims the benefit of U.S. Provisional Application Ser. No. 62/302,843, filed on Mar. 3, 2016, the disclosure of which is incorporated herein by reference in its entirety.

BACKGROUND OF THE INVENTION

The present invention relates generally to processes for reducing off-taste and odor of fluid milks or milk beverages—such as cooked flavor, sulfur odor, and brown color— via the UHT sterilization of certain milk fractions separately.

SUMMARY OF THE INVENTION

This summary is provided to introduce a selection of concepts in a simplified form that are further described herein. This summary is not intended to identify required or essential features of the claimed subject matter. Nor is this summary intended to be used to limit the scope of the claimed subject matter.

Processes for reducing certain off-tastes and odors in milk products are disclosed herein. In accordance with one embodiment of the present invention, a process to reduce cooked flavor, sulfur odor, and/or brown color of a finished milk product is provided, and in this embodiment, the process can comprise (i) subjecting a dairy composition comprising a protein-rich fraction to ultra-high temperature (UHT) sterilization to form a sterilized protein-rich composition, and (ii) combining the sterilized protein-rich composition with a second milk fraction to form the finished milk product. In this embodiment, the second milk fraction can comprise a milk sugar-rich fraction (or a derivative thereof), a milk water fraction, a fat-rich fraction, a mineral-rich fraction, a whey protein-rich fraction, a casein protein-rich fraction, or any combination thereof.

In another embodiment of the present invention, a process to reduce cooked flavor, sulfur odor, and/or brown color of a finished milk product is provided, and in this embodiment, the process can comprise (i) subjecting a dairy composition comprising a milk sugar-rich fraction (or a derivative thereof) to ultra-high temperature (UHT) sterilization to form a sterilized milk sugar-rich composition (or a derivative thereof), and (ii) combining the sterilized milk sugar-rich composition (or a derivative thereof) with a second milk fraction to form the finished milk product. In this embodiment, the second milk fraction can comprise a protein-rich fraction, a fat-rich fraction, a mineral-rich fraction, a milk water fraction, a whey protein-rich fraction, a casein protein-rich fraction, or any combination thereof.

In yet another embodiment of the present invention, a process to reduce cooked flavor, sulfur odor, and/or brown color of a finished milk product is provided, and in this embodiment, the process can comprise (i) subjecting a dairy composition comprising a fat-rich fraction to ultra-high temperature (UHT) sterilization to form a sterilized fat-rich composition, and (ii) combining the sterilized fat-rich composition with a second milk fraction to form the finished milk product. In this embodiment, the second milk fraction can comprise a protein-rich fraction, a milk sugar-rich fraction (or a derivative thereof), a milk water fraction, a mineral-rich fraction, a whey protein-rich fraction, a casein protein-rich fraction, or any combination thereof.

In still another embodiment of the present invention, a process to reduce cooked flavor, sulfur odor, and/or brown color of a finished milk product is provided, and in this embodiment, the process can comprise (i) subjecting a dairy composition comprising a casein protein-rich fraction to ultra-high temperature (UHT) sterilization to form a sterilized casein protein-rich composition, and (ii) combining the sterilized casein protein-rich composition with a second milk fraction to form the finished milk product. In this embodiment, the second milk fraction can comprise a protein-rich fraction, a milk sugar-rich fraction (or a derivative thereof), a milk water fraction, a fat-rich fraction, a mineral-rich fraction, a whey protein-rich fraction, or any combination thereof.

Unexpectedly, and beneficially, these processes can result in finished milk products with superior organoleptic properties.

Both the foregoing summary and the following detailed description provide examples and are explanatory only. Accordingly, the foregoing summary and the following detailed description should not be considered to be restrictive. Further, features or variations can be provided in addition to those set forth herein. For example, certain embodiments can be directed to various feature combinations and sub-combinations described in the detailed description.

DEFINITIONS

To define more clearly the terms used herein, the following definitions are provided. Unless otherwise indicated, the following definitions are applicable to this disclosure. If a term is used in this disclosure but is not specifically defined herein, the definition from the IUPAC Compendium of Chemical Terminology, $2^{nd}$ Ed (1997), can be applied, as long as that definition does not conflict with any other disclosure or definition applied herein, or render indefinite or non-enabled any claim to which that definition can be applied. To the extent that any definition or usage provided by any document incorporated herein by reference conflicts with the definition or usage provided herein, the definition or usage provided herein controls.

Herein, features of the subject matter are described such that, within particular aspects and/or embodiments, a combination of different features can be envisioned. For each and every aspect, and/or embodiment, and/or feature disclosed herein, all combinations that do not detrimentally affect the designs, compositions, processes, and/or methods described herein are contemplated with or without explicit description of the particular combination. Additionally, unless explicitly recited otherwise, any aspect, and/or embodiment, and/or feature disclosed herein can be combined to describe inventive designs, compositions, processes, and/or methods consistent with the present invention.

In this disclosure, while compositions and processes are often described in terms of "comprising" various components or steps, the compositions and processes can also "consist essentially of or" consist of the various components or steps, unless stated otherwise. For example, a dairy composition consistent with aspects of the present invention can comprise; alternatively, can consist essentially of; or alternatively, can consist of; a protein-rich fraction and a fat-rich fraction.

The terms "a," "an," and "the" are intended to include plural alternatives, e.g., at least one, unless otherwise specified. For instance, the disclosure of "a second milk fraction" and "an additional milk fraction" are meant to encompass one, or mixtures or combinations of more than one, second milk fraction and additional milk fraction, unless otherwise specified.

In the disclosed processes, the term "combining" encompasses the contacting of components in any order, in any manner, and for any length of time, unless otherwise specified. For example, the components can be combined by blending or mixing.

The milk sugar-rich fraction (or a derivative thereof), milk sugar (or a derivative thereof), and related terms are meant to encompass lactose and any derivatives thereof, e.g., hydrolyzed, un-hydrolyzed, epimerized, isomerized, or converted to oligosaccharides, before or after sterilization (UHT sterilization or otherwise), as would be recognized by one of skill in the art. Moreover, these terms are also meant to encompass glucose/galactose, such as may be produced by the treatment of lactose with lactase enzyme.

Although any methods and materials similar or equivalent to those described herein can be used in the practice or testing of the invention, the typical methods and materials are herein described.

Various numerical ranges are disclosed herein. When a range of any type is disclosed or claimed herein, the intent is to disclose or claim individually each possible number that such a range could reasonably encompass, including end points of the range as well as any sub-ranges and combinations of sub-ranges encompassed therein, unless otherwise specified. As a representative example, the present application discloses that a protein-rich fraction can have, in certain aspects, from about 6 to about 18 wt. % protein. By a disclosure that the protein content of the protein-rich fraction can be in a range from about 6 to about 18 wt. %, the intent is to recite that the protein content can be any amount within the range and, for example, can be equal to about 6, about 7, about 8, about 9, about 10, about 11, about 12, about 13, about 14, about 15, about 16, about 17, or about 18 wt. %. Additionally, the protein-rich fraction can contain an amount of protein within any range from about 6 to about 18 wt. % (for example, from about 8 to about 14 wt. %), and this also includes any combination of ranges between about 6 and about 18 wt. %. Likewise, all other ranges disclosed herein should be interpreted in a manner similar to this example.

The term "about" means that amounts, sizes, formulations, parameters, and other quantities and characteristics are not and need not be exact, but may be approximate including being larger or smaller, as desired, reflecting tolerances, conversion factors, rounding off, measurement errors, and the like, and other factors known to those of skill in the art. In general, an amount, size, formulation, parameter or other quantity or characteristic is "about" or "approximate" whether or not expressly stated to be such. The term "about" also encompasses amounts that differ due to different equilibrium conditions for a composition resulting from a particular initial mixture. Whether or not modified by the term "about," the claims include equivalents to the quantities. The term "about" can mean within 10% of the reported numerical value, preferably within 5% of the reported numerical value.

DETAILED DESCRIPTION OF THE INVENTION

Processes for reducing undesired tastes, odors, and/or colors of milk products are disclosed and described herein. Such processes can be used to reduce, for example, an undesirable cooked flavor of a milk product, an undesirable sulfur odor of a milk product, and/or an undesirable brown color of a milk product. These processes can result in higher quality milk products with better organoleptic properties, and in turn, can lead to less waste and consumer complaints resulting from milk products that are deemed unacceptable due to undesirable flavor, odor, or color.

This invention is principally directed to the unexpected finding that the UHT sterilization of certain milk fractions separately can lead to a finished milk product having less cooked flavor, sulfur odor, and/or brown color. As an example, the sterilization of a milk protein-rich fraction conducted separately from the sterilization of a milk sugar-rich fraction (or a derivative thereof), followed by combining these fractions together (e.g., with other milk fractions or components, aseptically combining and packaging), results in a milk product superior to that obtained in which the protein and milk sugar (e.g., lactose or a derivative thereof) components are sterilized together.

This is contrary to the general belief in the scientific community that heating or UHT treatment of whey proteins, which are very high in sulfur-containing amino acids, causes sulfur/eggy odors. As disclosed herein, heating of milk proteins without sugar/lactose reduces the amount of cooked flavor and sulfur/eggy odor.

While not wishing to be bound by the following theory, it is believed that the separate sterilizing or UHT processing of the protein-rich fraction and the milk sugar-rich fraction (or a derivative thereof) may reduce the chances of Maillard reactions, thereby reducing brown color formation, unpleasant flavor, or off-odor. The Maillard reactions also may reduce the nutritive value of proteins by blocking lysine (an essential amino acid of proteins). As disclosed herein, the milk products in which protein-rich fractions and sugar-rich fractions are sterilized separately and then mixed into the desired compositions are whiter with superior organoleptics than those in which protein and sugar fractions are sterilized together.

In one embodiment, a process to reduce cooked flavor, sulfur odor, and/or brown color of a finished milk product is provided, and in this embodiment, the process can comprise (or consist essentially of, or consist of) (i) subjecting a dairy composition comprising (or consisting essentially of, or consisting of) a protein-rich fraction to ultra-high temperature (UHT) sterilization to form a sterilized protein-rich composition, and (ii) combining the sterilized protein-rich composition with a second milk fraction to form the finished milk product. In this embodiment, the second milk fraction can comprise (or consist essentially of, or consist of) a milk sugar-rich fraction (or a derivative thereof), a milk water fraction, a fat-rich fraction, a mineral-rich fraction, a whey protein-rich fraction, a casein protein-rich fraction, or any combination thereof. Typically, the second milk fraction has been sterilized, e.g., via UHT sterilization or filter sterilization.

Further, if desired, step (i) can comprise subjecting a mixture of the protein-rich fraction and an additional milk fraction to ultra-high temperature (UHT) sterilization. Thus, the dairy composition can comprise the protein-rich fraction and an additional milk fraction comprising (or consisting essentially of, or consisting of) a fat-rich fraction, a mineral-rich fraction, a milk water fraction, a whey protein-rich fraction, a casein protein-rich fraction, or any combination thereof. For instance, and not limited thereto, step (i) can comprise subjecting a dairy composition comprising (or consisting essentially of, or consisting of) a protein-rich fraction and a fat-rich fraction to ultra-high temperature (UHT) sterilization.

In another embodiment, a process to reduce cooked flavor, sulfur odor, and/or brown color of a finished milk product is provided, and in this embodiment, the process can comprise (or consist essentially of, or consist of) (i) subjecting a dairy composition comprising (or consisting essentially of, or consisting of) a milk sugar-rich fraction (or a derivative thereof) to ultra-high temperature (UHT) sterilization to form a sterilized milk sugar-rich composition (or a derivative thereof), and (ii) combining the sterilized milk sugar-rich composition (or a derivative thereof) with a second milk fraction to form the finished milk product. In this embodiment, the second milk fraction can comprise (or consist essentially of, or consist of) a protein-rich fraction, a fat-rich fraction, a mineral-rich fraction, a milk water fraction, a whey protein-rich fraction, a casein protein-rich fraction, or any combination thereof. Typically, the second milk fraction has been sterilized.

Further, if desired, step (i) can comprise subjecting a mixture of the milk sugar-rich fraction (or a derivative thereof) and an additional milk fraction to ultra-high temperature (UHT) sterilization. Thus, the dairy composition can comprise the milk sugar-rich fraction (or a derivative thereof) and an additional milk fraction comprising (or consisting essentially of, or consisting of) a fat-rich fraction, a mineral-rich fraction, a milk water fraction, or any combination thereof. For instance, and not limited thereto, step (i) can comprise subjecting a dairy composition comprising (or consisting essentially of, or consisting of) a milk sugar-rich fraction (or a derivative thereof) and a mineral-rich fraction (or a milk sugar-rich fraction (or a derivative thereof) and a fat-rich fraction) to UHT sterilization.

In yet another embodiment, a process to reduce cooked flavor, sulfur odor, and/or brown color of a finished milk product is provided, and in this embodiment, the process can comprise (or consist essentially of, or consist of) (i) subjecting a dairy composition comprising (or consisting essentially of, or consisting of) a fat-rich fraction to ultra-high temperature (UHT) sterilization to form a sterilized fat-rich composition, and (ii) combining the sterilized fat-rich composition with a second milk fraction to form the finished milk product. In this embodiment, the second milk fraction can comprise (or consist essentially of, or consist of) a protein-rich fraction, a milk sugar-rich fraction (or a derivative thereof), a milk water fraction, a mineral-rich fraction, a whey protein-rich fraction, a casein protein-rich fraction, or any combination thereof. Typically, the second milk fraction has been sterilized.

Further, if desired, step (i) can comprise subjecting a mixture of the fat-rich fraction and an additional milk fraction to ultra-high temperature (UHT) sterilization. Thus, the dairy composition can comprise the fat-rich fraction and an additional milk fraction comprising (or consisting essentially of, or consisting of) a protein-rich fraction, a milk sugar-rich fraction (or a derivative thereof), a milk water fraction, a mineral-rich fraction, a whey protein-rich fraction, a casein protein-rich fraction, or any combination thereof. Not all combinations will necessarily result in improved organoleptic properties, for instance, subjecting a mixture of the fat-rich fraction, a protein-rich fraction, and a milk sugar-rich fraction (or a derivative thereof) to ultra-high temperature (UHT) sterilization. However, and not limited thereto, subjecting a mixture of a fat-rich fraction and a protein-rich fraction (a dairy composition comprising, consisting essentially of, or consisting of, a fat-rich fraction and a protein-rich fraction) to UHT sterilization can advantageously be performed in step (i).

In still another embodiment, a process to reduce cooked flavor, sulfur odor, and/or brown color of a finished milk product is provided, and in this embodiment, the process can comprise (or consist essentially of, or consist of) (i) subjecting a dairy composition comprising (or consisting essentially of, or consisting of) a casein protein-rich fraction to ultra-high temperature (UHT) sterilization to form a sterilized casein protein-rich composition, and (ii) combining the sterilized casein protein-rich composition with a second milk fraction to form the finished milk product. In this embodiment, the second milk fraction can comprise (or consist essentially of, or consist of) a protein-rich fraction, a milk sugar-rich fraction (or a derivative thereof), a milk water fraction, a fat-rich fraction, a mineral-rich fraction, a whey protein-rich fraction, or any combination thereof. Typically, the second milk fraction has been sterilized.

Further, if desired, step (i) can comprise subjecting a mixture of the casein protein-rich fraction and an additional milk fraction to ultra-high temperature (UHT) sterilization. Thus, the dairy composition can comprise the casein protein-rich fraction and an additional milk fraction comprising (or consisting essentially of, or consisting of) a protein-rich fraction, a fat-rich fraction, a mineral-rich fraction, a milk water fraction, a whey protein-rich fraction, or any combination thereof. For instance, and not limited thereto, step (i) can comprise subjecting a dairy composition comprising (or consisting essentially of, or consisting of) a casein protein-rich fraction and a fat-rich fraction to UHT sterilization.

As would be recognized by those of skill in the art, a sterilized milk fraction (or composition) also may be referred to as a pasteurized milk fraction (or composition), and UHT sterilization also may be referred to as UHT pasteurization. Moreover, processes consistent with embodiments of this invention, to reduce the undesired taste, odor, and/or color of a finished milk product, are applicable to any finished milk product that has been pasteurized or sterilized. Non-limiting examples of typical finished milk products can include whole milk, low-fat milk, skim milk, buttermilk, flavored milk, low lactose milk, high protein milk, lactose-free milk, ultra-filtered milk, micro-filtered milk, concentrated milk, evaporated milk, high protein, high calcium, and reduced sugar milk, and the like.

Generally, the features of the processes (e.g., the type and characteristics of the finished milk product, the milk fraction or composition subjected to UHT sterilization, the second milk fraction, the additional milk fraction that may be subjected to UHT sterilization along with the milk fraction, and the conditions of UHT sterilization, among others) are independently described herein and these features can be combined in any combination to further describe the disclosed processes. Moreover, other process steps can be conducted before, during, and/or after any of the steps listed in the disclosed processes, unless stated otherwise. Additionally, resultant milk products (e.g., finished milk products, ready for consumption) produced in accordance with any of the disclosed processes are within the scope of this disclosure and are encompassed herein.

For example, the second milk fraction can be a UHT sterilized second milk fraction, or the second milk fraction may have been previously UHT sterilized separately, prior to the combining step (step (ii)). Alternatively, the second milk fraction can be a filter sterilized second milk fraction, or the second milk fraction may have been previously filter sterilized separately, prior to the combining step. As an example, microfiltration (or ultrafiltration) of milk sugar-rich (or a derivative thereof), mineral-rich, and/or whey protein-rich fractions can be utilized, and then one or more of these filter sterilized fractions can be combined with a UHT sterilized milk fraction. For instance, and not limited thereto, a filter sterilized milk sugar-rich fraction (or a derivative thereof) and a filter sterilized mineral-rich fraction can be combined, in any desired proportions, with a UHT sterilized mixture of a protein-rich fraction and a fat-rich fraction to form a finished milk product.

While not wishing to be bound by the following theory, it is believed that filter sterilization—the permeate stream of an ultrafiltration process and/or a microfiltration process—of a mineral-rich fraction and/or a milk sugar-rich fraction or a derivative thereof, can result in improved organoleptics as compared to UHT sterilization of the respective milk fractions, thereby reducing the off-taste, odor, and/or color of a finished milk product. Typical microfiltration membrane/pore size can be in the 0.1 to 10 micron range, and typical ultrafiltration membrane/pore size can be in the 0.01-0.1 micron range (nanofiltration also can be used, if desired, for a component fraction, such as a mineral-rich fraction; the nanofiltration membrane/pore size can be in the 0.001 to 0.01 micron range).

Also, while not wishing to be bound by the following theory, it is believed that UHT indirect sterilization, by virtue of it utilizing a closed system, can result in improved organoleptics as compared to UHT direct sterilization, where steam is in direct contact with the milk product/fraction, and the removal of the water (e.g., vacuum) may volatilize some of the flavor components from the milk product/fraction. Thus, the use of UHT indirect sterilization of a respective milk fraction (e.g., a mineral-rich fraction, milk sugar-rich fraction, etc.) can result in improved organoleptics as compared to UHT direct sterilization of the respective milk fraction, thereby reducing the off-taste, odor, and/or color of a finished milk product.

In other embodiments, the second milk fraction in step (ii) of the process disclosed herein can comprise any suitable concentrated milk fraction (one or more), which can be combined with the respective UHT sterilized milk fraction to form a finished milk product. The concentrated milk fraction can include a concentrated protein-rich fraction, a concentrated mineral-rich fraction, a concentrated whey protein-rich fraction, and the like, as well as combinations thereof. The concentrated milk fraction also can include a concentrated lactose-rich fraction (e.g., hydrolyzed or unhydrolyzed), a concentrated glucose-rich fraction, a concentrated galactose-rich fraction, a concentrated milk fructose-rich fraction, as well as any epimerized lactose or its hydrolyzed individualized fractions that are individually isomerized or epimerized, and combinations of these fractions can be used.

Consistent with the processes disclosed herein, the protein-rich fraction often can contain from about 3 to about 24 wt. % protein and less than about 2.5 wt. % milk sugar (i.e., in any form, hydrolyzed, un-hydrolyzed, epimerized, etc.). In some embodiments, the protein-rich fraction can contain from about 5 to about 20 wt. % protein, or from about 6 to about 18 wt. % protein. Additionally or alternatively, the protein-rich fraction can contain less than about 2 wt. % milk sugar, less than about 1 wt. % milk sugar, or less than about 0.5 wt. % milk sugar. Other appropriate ranges for the protein content and milk sugar content of the protein-rich fraction are readily apparent from this disclosure.

Consistent with the processes disclosed herein, the milk sugar-rich fraction (or a derivative thereof) often can contain from about 3 to about 20 wt. % milk sugar (i.e., in any form, hydrolyzed, un-hydrolyzed, epimerized, etc.) and less than about 1 wt. % protein. In some embodiments, the milk sugar-rich fraction (or a derivative thereof) can contain from about 3 to about 15 wt. % milk sugar, or from about 4 to about 15 wt. % milk sugar. Additionally or alternatively, the milk sugar-rich fraction (or a derivative thereof) can contain less than about 0.5 wt. % protein, less than about 0.25 wt. % protein, or less than about 0.15 wt. % protein. Other appropriate ranges for the sugar content and protein content of the milk sugar-rich fraction (or a derivative thereof) are readily apparent from this disclosure.

In an embodiment, the fat-rich fraction often can contain from about 18 to about 45 wt. % fat, from about 20 to 43 wt. % fat, or from about 22 to about 40 wt. %. Additionally, the fat-rich fraction often can contain less than about 2 wt. % protein and less than about 3 wt. % milk sugar, or less than about 1 wt. % protein and less than about 1 wt. % milk sugar, or less than about 0.5 wt. % protein and less than about 0.5 wt. % milk sugar. Other appropriate ranges for the fat, protein, and sugar contents of the fat-rich fraction are readily apparent from this disclosure.

In some embodiments, the mineral-rich fraction can contain from about 0.2 to about 20 wt. % minerals, or from about 0.2 to about 15 wt. % minerals, while in other embodiments, the mineral-rich fraction can contain from about 0.2 to about 10 wt. % minerals, or from about 0.5 to about 8 wt. % minerals. Other appropriate ranges for the mineral content of the mineral-rich fraction are readily apparent from this disclosure.

In some embodiments, the milk water fraction can contain at least 90 wt. % water, at least 95 wt. % water, at least 98 wt. % water, at least 99 wt. % water, or at least 99.5 wt. % water. In further embodiments, the mineral-rich fraction and the milk water fraction can be combined in any relative proportions, if desired.

In some embodiments, the whey protein-rich fraction can contain from about 0.4 to about 45 wt. % whey protein, or from about 0.4 to 25 wt. % whey protein, while in other embodiments, the whey protein-rich fraction can contain from about 1 to about 40 wt. % whey protein, or from about 1 to about 20 wt. % whey protein. Other appropriate ranges for the whey protein content of the whey protein-rich fraction are readily apparent from this disclosure.

In an embodiment, the casein protein-rich fraction often can contain from about 3 to about 20 wt. % casein protein and less than about 2.5 wt. % sugar or lactose (i.e., in any form, hydrolyzed, un-hydrolyzed, epimerized, etc.). In some embodiments, the casein protein-rich fraction can contain from about 3 to about 12 wt. % casein protein, or from about 4 to about 10 wt. % casein protein. Additionally or alternatively, the casein protein-rich fraction can contain less than about 2 wt. % sugar, less than about 1 wt. % sugar, or less than about 0.5 wt. % sugar. Other appropriate ranges for the casein protein content and sugar content of the casein protein-rich fraction are readily apparent from this disclosure.

In this disclosure, ultra-high temperature (UHT) sterilization (also referred to in the art as UHT pasteurization) refers to the generally high temperature treatment of a milk fraction (or a mixture of milk fractions) for a relatively short time period. UHT sterilization can be conducted at a variety of suitable temperature and time conditions, as would be recognized by those of skill in the art. Representative and non-limiting examples of UHT conditions include a temperature in a range from about 130° C. to about 150° C. for a time period of from about 1 to about 15 sec, a temperature in a range from about 130° C. to about 150° C. for a time period of from about 2 to about 4 sec, a temperature in a range from about 135° C. to about 145° C. for a time period of from about 1 to about 10 sec, or a temperature in a range from about 135° C. to about 145° C. for a time period of from about 2 to about 5 sec, and the like. Other appropriate UHT sterilization temperature and time conditions are readily apparent from this disclosure.

This invention is not limited by the method or equipment used for performing the UHT sterilization process, unless stated otherwise. Suitable UHT sterilization techniques that can be employed include indirect steam injection, direct steam injection, direct steam infusion, indirect heating, direct heating, a hybrid of direct and indirect heating, and the like. The sterilization process also can be a batch sterilization process, such as at 121° C. for 20-30 minutes, or an equivalent. Moreover, combinations of these techniques can be employed, if desired. Other suitable sterilization systems also can be used, such as filter sterilization by ultrafiltration/microfiltration or by ultraviolet irradiation, high pressure or by ohmic heating, cavitation or by ultra-sonification, and the like.

In some embodiments of this invention, the processes to reduce the undesired taste, odor, and/or color characteristics of a finished milk product can include a step of cooling after the UHT sterilization has been performed. For instance, one such process can comprise subjecting any of the milk fractions disclosed herein (e.g., protein-rich, milk sugar-rich (or a derivative thereof), fat-rich, casein protein-rich) to ultra-high temperature (UHT) sterilization to form a sterilized milk fraction, cooling the sterilized milk fraction to any suitable temperature, and combining the sterilized milk fraction with a second milk fraction to form the finished milk product. Often, the sterilized milk fraction can be cooled to a temperature of less than or equal to about 50° C., less than or equal to about 45° C., less than or equal to about 40° C., or less than or equal to about 35° C. In other embodiments, the respective milk fraction can be cooled after UHT sterilization to a temperature in a range from about 1° C. to about 50° C., in a range from about 5° C. to about 40° C., in a range from about 8° C. to about 45° C., in a range from about 10° C. to about 45° C., in a range from about 15° C. to about 40° C., or in a range from about 20° C. to about 40° C., and the like. Other appropriate cooling temperatures are readily apparent from this disclosure.

The combining step (e.g., step (ii)) in the processes disclosed herein can be conducted at any suitable conditions, for instance, any conditions sufficient to reduce (or eliminate) one or more of the undesired cooked flavor, the undesired sulfur odor, the undesired brown color, or any combination thereof. Beneficially, the combining step can be conducted aseptically, and can be conducted at a variety of temperatures and time periods. Generally, the combining step can be conducted at any temperature sufficient to reduce the undesired cooked flavor, sulfur odor, and/or brown color. In some illustrative and non-limiting embodiments, the combining step, independently, can be conducted at a temperature in a range from about 0° C. to about 75° C.; alternatively, from about 0° C. to about 50° C.; alternatively, from about 5° C. to about 50° C.; alternatively, from about 5° C. to about 35° C.; alternatively, from about 10° C. to about 60° C.; alternatively, from about 10° C. to about 35° C.; alternatively, from about 10° C. to about 25° C.; or alternatively, from about 15° C. to about 30° C. In these and other embodiments, these temperature ranges also are meant to encompass circumstances where the respective combining step is conducted at a series of different temperatures, instead of at a single fixed temperature, falling within the respective ranges. Other appropriate temperature ranges at which the sterilized milk fraction and the second milk fraction can be combined are readily apparent from this disclosure.

The duration of the combining step (e.g., step (ii)) is not limited to any particular period of time. Generally, however, the combining step can range from as little as 5-30 seconds to as long as 48-72 hours, or more. The appropriate combining time can depend upon, for example, the temperature, the relative amounts of the sterilized milk fraction and the second milk fraction, the addition of other materials or milk fractions used to form the finished milk product, the degree of mixing, and considerations for long term storage, among other variables. In some illustrative and non-limiting embodiments, the combining step can be conducted for at least about 30 seconds, at least about 5 min, at least about 15 min, at least about 1 hr, at least about 3 hr, at least about 6 hr, and so forth. Assuming the milk product, after combining, is not intended for long term storage, which could extend for weeks or months, typical ranges for the combining time can include, but are not limited to, from about 5 sec to about 48 hr, from about 15 min to about 48 hr, from about 15 min to about 12 hr, from about 1 min to about 48 hr, from about 5 min to about 24 hr, from about 30 min to about 15 hr, from about 30 min to about 8 hr, from about 1 hr to about 36 hr, from about 1 hr to about 18 hr, or from about 1 hr to about 12 hr, and the like. Other appropriate periods of time for which the sterilized milk fraction and the second milk fraction can be combined are readily apparent from this disclosure.

As would be readily recognized by those of skill in the art, in addition to combining the particular sterilized component-rich fraction with the second milk fraction in step (ii), other ingredients (e.g., flavors and additives) and milk fractions also can be added to the form the desired finished milk product. Any suitable vessel and conditions can be used for combining the milk fractions, and such can be accomplished batchwise or continuously. As an example, the milk fractions can be combined in a suitable vessel (e.g., a tank, a silo, etc.) under atmospheric pressure, optionally with agitation or mixing, and with other materials and milk fractions to form a batch of the finished milk product. As another example, the milk fractions can be combined continuously in a pipe or other suitable vessel under slight pressure (e.g., 5-50 psig), optionally mixed with other materials and milk fractions, and the finished milk product can be transferred to a storage tank or filled into containers for retail distribution and sale. Representative systems that can be used for this continuous combining, mixing, and/or packaging can include tetra aldose systems and tetra flexidose systems. Other appropriate methods, systems, and apparatus for combining milk fractions and other materials are readily apparent from this disclosure.

In some embodiments of this invention, the processes to reduce the undesired taste, odor, and/or color characteristics of a finished milk product can further comprise a step of packaging (aseptically or otherwise) the finished milk product in any suitable container and under any suitable conditions. Thus, after combining the sterilized milk fraction with the second milk fraction (and any other milk fractions or materials) to form the finished milk product, the finished milk product can be packaged under aseptic conditions (or non-aseptic conditions) in a container. Any suitable container can be used, such as might be used for the distribution and/or sale of milk products in a retail outlet. Illustrative and non-limiting examples of typical containers include a cup, a bottle, a bag, or a pouch, and the like. The container can be made from any suitable material, such as glass, metal, plastics, and the like, as well as combinations thereof.

The processes disclosed herein can further comprise a step of cooling the finished milk product to any suitable temperature, and this cooling step can occur before, during, and/or after packaging the finished milk product in a container. In some illustrative and non-limiting embodiments, the finished milk product can be cooled to a temperature in a range from about 0° C. to about 30° C.; alternatively, from about 0° C. to about 15° C.; alternatively, from about 1° C. to about 30° C.; alternatively, from about 1° C. to about 15° C.; alternatively, from about 1° C. to about 9° C.; alternatively, from about 1° C. to about 6° C.; alternatively, from about 2° C. to about 15° C.; or alternatively, from about 2° C. to about 8° C. Other appropriate temperature ranges for cooling the finished milk product are readily apparent from this disclosure.

Any of the milk fractions disclosed herein—any component-rich fraction (e.g., protein-rich, casein protein-rich, fat-rich, milk sugar-rich), any second milk fraction, and any additional milk fraction—can be produced by any technique known to those of skill in the art. While not limited thereto, the milk fraction (or milk fractions) can be produced by a membrane filtration process, such as disclosed in U.S. Pat. Nos. 7,169,428, 9,510,606, and 9,538,770, which are incorporated herein by reference in their entirety. For example, fresh or pasteurized raw milk can be fractionated into fat-free milk and cream (fat-rich fraction) by centrifugal separators. The fat-free milk can be fractionated via combinations of microfiltration, ultrafiltration, nanofiltration, and reverse osmosis into a milk protein-rich fraction, a casein protein-rich fraction, a milk soluble protein-rich fraction, a milk sugar-rich fraction, a milk mineral-rich fraction, and a milk water fraction. Additionally or alternatively, the milk fraction (or milk fractions) can be produced by a process comprising mixing water and a powder ingredient (e.g., protein powder, lactose powder, mineral powder, etc.).

The finished milk products produced as described herein can have excellent shelf-stability, either without refrigeration or under refrigerated conditions. In one embodiment, the finished milk products, advantageously, can be shelf-stable without refrigeration under a variety of temperature and time conditions, such as shelf-stable at a temperature in a range from about 10° C. to about 50° C. for a time period of from about 2 to about 365 days, shelf-stable at a temperature in a range from about 10° C. to about 50° C. for a time period of from about 5 to about 180 days, shelf-stable at a temperature in a range from about 15° C. to about 40° C. for a time period of from about 2 to about 365 days, shelf-stable at a temperature in a range from about 15° C. to about 40° C. for a time period of from about 5 to about 180 days, shelf-stable at a temperature of from about 20° C. to about 30° C. for a time period of from about 2 to about 365 days, or shelf-stable at a temperature in a range from about 20° C. to about 30° C. for a time period of from about 5 to about 180 days, and the like. In another embodiment, the finished milk products, advantageously, can be shelf-stable under a variety of refrigerated temperature and time conditions, such as shelf-stable at a temperature in a range from about 1° C. to about 9° C. for a time period of from about 7 to about 365 days, shelf-stable at a temperature in a range from about 1° C. to about 9° C. for a time period of from about 10 to about 180 days, shelf-stable at a temperature in a range from about 2° C. to about 8° C. for a time period of from about 7 to about 365 days, shelf-stable at a temperature in a range from about 2° C. to about 8° C. for a time period of from about 10 to about 180 days, shelf-stable at a temperature of from about 3° C. to about 7° C. for a time period of from about 7 to about 365 days, or shelf-stable at a temperature in a range from about 3° C. to about 7° C. for a time period of from about 10 to about 180 days, and the like. Other appropriate shelf-stable temperature and time conditions are readily apparent from this disclosure.

Beneficially, and unexpectedly, the processes disclosed herein are very effective at reducing undesirable taste, odor, and/or color characteristics of a milk product. In particular embodiments of this invention, the respective finished milk products produced by the processes disclosed herein can have less cooked flavor, less sulfur odor, and/or less brown color than that of (or as compared to that of) a respective finished milk product obtained by the UHT sterilization of an unpasteurized milk product containing all the milk fractions together, under the same processing conditions (e.g., UHT conditions) and with the same milk component amounts (same amount of fat, protein, sugar/lactose, etc.). Hence, the only difference is the sterilization of certain milk fractions separately versus the standard sterilization of all milk fractions together. Thus, in one embodiment, the finished milk product can have less cooked flavor, while in another embodiment, the finished milk product can have less sulfur odor. In another embodiment, the finished milk product can have less brown color. In yet another embodiment, the finished milk product can have less cooked flavor and less sulfur odor, or less cooked flavor and less brown color, or less sulfur odor and less brown color. In still another embodiment, the finished milk product can have less cooked flavor, less sulfur odor, and less brown color.

Also beneficially, and unexpectedly, the respective finished milk products produced by the processes disclosed herein can have less cooked flavor, less sulfur odor, and/or less brown color than that of (or as compared to that of) a respective finished milk product obtained by the UHT sterilization of an unpasteurized milk product containing protein and sugar/lactose (e.g., containing a protein-rich fraction and a milk sugar-rich fraction (or a derivative thereof), often with at least 0.5 wt. % milk sugar and at least 0.25 wt. % protein) together, under the same processing conditions (e.g., UHT conditions) and with the same milk component amounts (same amount of fat, protein, sugar/lactose, etc.). Hence, the only difference is the sterilization of the protein-rich fraction and the milk sugar-rich fraction (or a derivative thereof) separately versus the standard sterilization of a milk product containing protein and sugar/lactose together. Thus, in one embodiment, the finished milk product can have less cooked flavor, while in another embodiment, the finished milk product can have less sulfur odor. In another embodiment, the finished milk product can have less brown color. In yet another embodiment, the finished milk product can have less cooked flavor and less sulfur odor, or less cooked flavor and less brown color, or less sulfur odor and less brown color. In still another embodiment, the finished milk product can have less cooked flavor, less sulfur odor, and less brown color.

Moreover, also beneficially and unexpectedly, the processes disclosed herein are very effective at reducing the amount of sulfur-containing compounds, for example, below the human sensory threshold levels for off-taste and odor. While not being limited thereto, an exemplary sulfur-containing compound often associated with off-taste and odor is hydrogen sulfide ($H_2S$), and its concentration can be reduced to below its sensory threshold of about 10 ppb (parts per billion, weight basis).

A representative and non-limiting example of a process consistent with this invention (a first process) can reduce the cooked flavor, sulfur odor, and/or brown color of a finished milk product, and can comprise (a) subjecting a dairy composition comprising a protein-rich fraction to UHT sterilization to form a sterilized protein-rich composition; (b) subjecting a second milk fraction comprising a milk sugar-rich fraction or a derivative thereof, a milk water fraction, a fat-rich fraction, a mineral-rich fraction, or any combination thereof, to a sterilization process to form a sterilized second milk fraction; and (c) combining the sterilized protein-rich composition with the sterilized second milk fraction to form the finished milk product. In one embodiment of this first process, the dairy composition (or the sterilized protein-rich composition) can comprise from about 5 to about 20 wt. % protein (or from about 8 to about 14 wt. % protein), and the second milk fraction (or the sterilized second milk fraction) can comprise from about 0.1 to about 25 wt. % fat (or from about 0.2 to about 20 wt. % fat), from about 0.1 to about 2 wt. % minerals (or from about 0.2 to about 1 wt. % minerals), and from about 1 to about 12 wt. % milk sugar (or from about 2 to about 8 wt. % milk sugar), while in another embodiment, the dairy composition (or the sterilized protein-rich composition) can comprise from about 6 to about 18 wt. % protein (or from about 4 to about 7 wt. % protein), and the second milk fraction (or the sterilized second milk fraction) can comprise from about 0.2 to about 10 wt. % fat (or from about 0.2 to about 5 wt. % fat), from about 0.3 to about 1 wt. % minerals (or from about 0.1 to about 0.8 wt. % minerals), and from about 2 to about 7 wt. % milk sugar (or from about 1 to about 5 wt. % milk sugar). In further embodiments, the dairy composition (or the sterilized protein-rich composition) can contain less than about 1 wt. % milk sugar, less than about 0.75 wt. % milk sugar, less than about 0.5 wt. % milk sugar, or less than about 0.25 wt. % milk sugar. Additionally or alternatively, the second milk fraction (or the sterilized second milk fraction) can contain less than about 1 wt. % protein, less than about 0.75 wt. % protein, less than about 0.5 wt. % protein, or less than about 0.25 wt. % protein. Moreover, as disclosed hereinabove, step (c) can comprise combining the sterilized protein-rich composition, the sterilized second milk fraction, and an additional ingredient or ingredients (e.g., flavors, additives, additional milk fractions or components) to form the finished milk product.

Another representative and non-limiting example of a process consistent with this invention (a second process) can reduce the cooked flavor, sulfur odor, and/or brown color of a finished milk product, and can comprise (a) subjecting a dairy composition comprising a protein-rich fraction and a fat-rich fraction to UHT sterilization to form a sterilized composition; (b) subjecting a second milk fraction comprising a milk sugar-rich fraction or a derivative thereof, a milk water fraction, a mineral-rich fraction, or any combination thereof, to a sterilization process to form a sterilized second milk fraction; and (c) combining the sterilized composition with the sterilized second milk fraction to form the finished milk product. In this second process, the sterilization in step (b) can be, for example, UHT sterilization conducted using indirect heating, or filter sterilization conducted using ultrafiltration and/or microfiltration. In one embodiment of this second process, the dairy composition (or the sterilized composition) can comprise from about 6 to about 15 wt. % protein (or from about 9 to about 14 wt. % protein) and from about 0.1 to about 10 wt. % fat (or from about 0.2 to about 6 wt. % fat), and the second milk fraction (or the sterilized second milk fraction) can comprise from about 0.2 to about 2 wt. % minerals (or from about 0.4 to about 1 wt. % minerals) and from about 1 to about 8 wt. % milk sugar (or from about 2 to about 8 wt. % milk sugar), while in another embodiment, the dairy composition (or the sterilized composition) can comprise from about 3 to about 14 wt. % protein (or from about 3 to about 8 wt. % protein) and from about 0.2 to about 8 wt. % fat (or from about 0.2 to about 5 wt. % fat), and the second milk fraction (or the sterilized second milk fraction) can comprise from about 0.4 to about 1.5 wt. % minerals (or from about 0.3 to about 1 wt. % minerals) and from about 0.5 to about 5 wt. % milk sugar (or from about 2 to about 5 wt. % milk sugar). In further embodiments, the dairy composition (or the sterilized composition) can contain less than about 1 wt. % milk sugar, less than about 0.75 wt. % milk sugar, less than about 0.5 wt. % milk sugar, or less than about 0.25 wt. % milk sugar. Additionally or alternatively, the second milk fraction (or the sterilized second milk fraction) can contain less than about 1 wt. % protein, less than about 0.75 wt. % protein, less than about 0.5 wt. % protein, or less than about 0.25 wt. % protein. Moreover, as disclosed hereinabove, step (c) can comprise combining the sterilized composition, the sterilized second milk fraction, and an additional ingredient or ingredients (e.g., flavors, additives, additional milk fractions or components) to form the finished milk product.

Yet, another representative and non-limiting example of a process consistent with this invention (a third process) can reduce the cooked flavor, sulfur odor, and/or brown color of a finished milk product, and can comprise (a) subjecting a dairy composition comprising a protein-rich fraction to UHT sterilization to form a sterilized protein-rich composition; (b) subjecting a second milk fraction comprising a fat-rich fraction and milk sugar-rich fraction or a derivative thereof to UHT sterilization to form a sterilized second milk fraction; (c) subjecting a third milk fraction comprising a mineral-rich fraction to a sterilization process to form a sterilized third milk fraction; and (d) combining the sterilized protein-rich composition, the sterilized second milk fraction, and the sterilized third milk fraction to form the finished milk product. In this third process, the sterilization in step (c) can be, for example, UHT sterilization conducted using indirect heating, or filter sterilization conducted using ultrafiltration and/or microfiltration. In one embodiment of this third process, the dairy composition (or the sterilized protein-rich composition) can comprise from about 5 to about 20 wt. % protein (or from about 8 to about 14 wt. % protein), the second milk fraction (or the sterilized second milk fraction) can comprise from about 0.1 to about 15 wt. % fat (or from about 0.2 to about 8 wt. % fat) and from about 1 to about 12 wt. % milk sugar (or from about 2 to about 8 wt. % milk sugar), and the third milk fraction (or the sterilized third milk fraction) can comprise from about 0.1 to about 8 wt. % minerals (or from about 0.4 to about 2 wt. % minerals), while in another embodiment, the dairy composition (or the sterilized protein-rich composition) can comprise from about 3 to about 14 wt. % protein (or from about 3 to about 8 wt. % protein), the second milk fraction (or the sterilized second milk fraction) can comprise from about 0.2 to about 10 wt. % fat (or from about 0.2 to about 6 wt. % fat), and from about 0.5 to about 6 wt. % milk sugar (or from about 1 to about 5 wt. % milk sugar), and the third milk fraction (or the sterilized third milk fraction) can comprise from about 0.2 to about 3 wt. % minerals (or from about 0.4 to about 1 wt. % minerals). In further embodiments, the dairy composition (or the sterilized protein-rich composition) can contain less than about 1 wt. % milk sugar, less than about 0.75 wt. % milk sugar, less than about 0.5 wt. % milk sugar, or less than about 0.25 wt. % milk sugar. Additionally or alternatively, the second milk fraction (or the sterilized second milk fraction) can contain less than about 1 wt. % protein, less than about 0.75 wt. % protein, less than about 0.5 wt. % protein, or less than about 0.25 wt. % protein. Moreover, as disclosed hereinabove, step (d) can comprise combining the sterilized protein-rich composition, the sterilized second milk fraction, the sterilized third milk fraction, and an additional ingredient or ingredients (e.g., flavors, additives, additional milk fractions or components) to form the finished milk product.

Another representative and non-limiting example of a process consistent with this invention (a fourth process) can reduce the cooked flavor, sulfur odor, and/or brown color of a finished milk product, and can comprise (a) subjecting a dairy composition comprising a casein protein-rich fraction to UHT sterilization to form a sterilized casein protein-rich composition; (b) subjecting a second milk fraction comprising a milk sugar-rich fraction or a derivative thereof to a sterilization process to form a sterilized second milk fraction; and (c) combining the sterilized casein protein-rich composition with the sterilized second milk fraction to form the finished milk product. In this fourth process, the sterilization in step (b) can be, for example, UHT sterilization conducted using direct and/or indirect heating, or filter sterilization conducted using ultrafiltration and/or microfiltration. In one embodiment of this fourth process, the dairy composition (or the sterilized casein protein-rich composition) can comprise from about 1 to about 12 wt. % casein protein (or from about 2 to about 8 wt. % casein protein), from about 0.1 to about 15 wt. % fat (or from about 0.2 to about 8 wt. % fat), and from about 0.1 to about 5 wt. % minerals (or from about 0.4 to about 2 wt. % minerals), and the second milk fraction (or the sterilized second milk fraction) can comprise from about 2 to about 10 wt. % milk sugar (or from about 3 to about 14 wt. % milk sugar), while in another embodiment, the dairy composition (or the sterilized casein protein-rich composition) can comprise from about 3 to about 7 wt. % casein protein (or from about 4 to about 6 wt. % casein protein), from about 0.2 to about 6 wt. % fat (or from about 0.2 to about 4 wt. % fat), and from about 0.3 to about 1.5 wt. % minerals (or from about 0.6 to about 1 wt. % minerals), and the second milk fraction (or the sterilized second milk fraction) can comprise from about 1.5 to about 7 wt. % milk sugar (or from about 1 to about 6 wt. % milk sugar). In further embodiments, the dairy composition (or the sterilized casein protein-rich composition) can contain less than about 1 wt. % milk sugar, less than about 0.75 wt. % milk sugar, less than about 0.5 wt. % milk sugar, or less than about 0.25 wt. % milk sugar. Additionally or alternatively, the second milk fraction (or the sterilized second milk fraction) can contain less than about 1 wt. % protein, less than about 0.75 wt. % protein, less than about 0.5 wt. % protein, or less than about 0.25 wt. % protein. Moreover, as disclosed hereinabove, step (c) can comprise combining the sterilized casein protein-rich composition, the sterilized second milk fraction, and an additional ingredient or ingredients (e.g., flavors, additives, additional milk fractions or components) to form the finished milk product.

Generally, the features of the first, second, third, and fourth processes (e.g., the type and characteristics of the finished milk product, the milk fraction or composition subjected to sterilization (UHT or otherwise), and the second milk fraction, among others) are independently described herein and these features can be combined in any combination to further describe the disclosed processes. Moreover, other process steps can be conducted before, during, and/or after any of the steps listed in the disclosed processes, unless stated otherwise. Additionally, resultant milk products (e.g., finished milk products, ready for consumption) produced in accordance with any of the disclosed processes are within the scope of this disclosure and are encompassed herein.

Beneficially, and unexpectedly, the first, second, third, and fourth processes disclosed herein are very effective at reducing off-taste, odor, and/or color characteristics of a milk product. In particular embodiments of this invention, the respective finished milk products produced by these processes can have less cooked flavor, less sulfur odor, and/or less brown color than that of (or as compared to that of) a respective finished milk product obtained by the UHT sterilization of an unpasteurized milk product containing all the milk fractions together, under the same processing conditions (e.g., UHT conditions) and with the same milk component amounts (same amount of fat, protein, sugar/lactose, etc.). Hence, the only difference is the sterilization of certain milk fractions separately versus the standard sterilization of all milk fractions together. Thus, in one embodiment, the finished milk product can have less cooked flavor, while in another embodiment, the finished milk product can have less sulfur odor. In another embodiment, the finished milk product can have less brown color. In yet another embodiment, the finished milk product can have less cooked flavor and less sulfur odor, or less cooked flavor and less brown color, or less sulfur odor and less brown color. In still another embodiment, the finished milk product can have less cooked flavor, less sulfur odor, and less brown color.

EXAMPLES

The invention is further illustrated by the following examples, which are not to be construed in any way as imposing limitations to the scope of this invention. Various other aspects, embodiments, modifications, and equivalents thereof which, after reading the description herein, can suggest themselves to one of ordinary skill in the art without departing from the spirit of the present invention or the scope of the appended claims.

Examples 1-2

For Example 1, raw milk was fractionated into fat-rich, protein-rich, milk sugar-rich (or a derivative thereof), and mineral-rich fractions by a series of membrane technology steps. Table I summarizes the compositions of the raw milk fractions used for making the comparative milk composition of Example 1. These fractions were made lactose-free by treatment with lactase enzyme, or some fractions did not have any lactose due to its complete retention or flow through the membranes. The milk fractions were blended at the relative amounts in Table III to produce a blended milk composition containing 2 wt. % fat, 5.2 wt. % protein, 2.5 wt. % sugar (glucose/galactose), and 0.75 wt. % minerals. The blended milk composition was then subjected to UHT sterilization, via direct steam injection, at a temperature of 140° C. for 3 seconds, resulting in the milk product of Example 1.

For Example 2, raw milk was fractionated into fat-rich, protein-rich, milk sugar-rich (or a derivative thereof), and mineral-rich fractions by a series of membrane technology steps. Table II summarizes the compositions of the raw milk fractions used for making the inventive milk composition of Example 2. These fractions were made lactose-free by treatment with lactase enzyme, or some fractions did not have any lactose due to its complete retention or flow through the membranes. Then, (i) the protein-rich fraction, (ii) the fat-rich fraction, (iii) the milk sugar-rich fraction (or a derivative thereof), and (iv) the mineral-rich fraction were separately subjected to UHT sterilization, via direct steam injection, at a temperature of 140° C. for 3 seconds. The sterilized milk fractions were blended at the relative amounts in Table III to produce the blended milk product of Example 2, which contained 2 wt. % fat, 5.2 wt. % protein, 2.5 wt. % sugar (glucose/galactose), and 0.75 wt. % minerals.

After storage for 24 hours after UHT sterilization, the finished milk products of Examples 1-2 were evaluated for organoleptic properties by four individuals. Table IV summarizes the sensory test parameters, with a scale from "1" being the least acceptable to "10" being most acceptable. For every sensory test parameter, the milk product of Example 2 was equal or superior to that of the milk product of Example 1. These results demonstrate that the "eggy" smells and "cooked" flavors were reduced in Example 2 as compared to Example 1, confirming the unexpected and beneficial results that heating certain fractions of the milk separately can provide.

The finished milk products of Examples 1-2 were submitted for color analysis to determine differences in off-color or brown color. A sample of each milk product was poured into a clear glass petri dish. Hunter colorimeter values {L*: dark (0), light (100); a*; green (−), red (+); b": blue (−), yellow (+)} were measured on the milk product in the petri dish in triplicate, and Table V summarizes the average values. Table V demonstrates that the milk product of Example 1 had more off/brown color than that of Example 2, again confirming the unexpected and beneficial results that heating certain fractions of the milk separately can provide.

Constructive Example 3

For Constructive Example 3, the raw milk fractions in Table II can be used, and can be made lactose-free by treatment with lactase enzyme, or some fractions do not have any lactose due to its complete retention or flow through the membranes. The protein-rich fraction (13 wt. % protein, 0.5 wt. % sugar (glucose/galactose)) is subjected to UHT direct sterilization at a temperature of 138-142° C. for 1-6 seconds to form a sterilized protein-rich composition. Separately, a second milk fraction containing 76 wt. % sugar-rich fraction (or a derivative thereof), 7 wt. % fat-rich fraction, and 17 wt. % mineral-rich fraction is blended to contain approximately 3 wt. % fat, 0.2 wt. % protein, 3.9 wt. % sugar (glucose/galactose), and 0.6 wt. % minerals. The second milk fraction is subjected to UHT direct sterilization at a temperature of 138-142° C. for 1-6 seconds to form a sterilized second milk fraction. Then, 39 wt. % of the sterilized protein-rich composition and 61 wt. % of the sterilized second milk fraction are blended to produce a finished milk product containing approximately 2 wt. % fat, 5.2 wt. % protein, 2.5 wt. % sugar (glucose/galactose), and 0.75 wt. % minerals.

After storage for 24 hours after UHT sterilization and blending to form the finished milk product, it is expected that the organoleptic properties of the finished milk product of Constructive Example 3 would be superior to that of Example 1 and comparable to that of Example 2, as shown in Table IV and Table V. The protein-rich fraction contains only 0.5 wt. % sugar and is UHT sterilized separately from a sugar-rich fraction. The second milk fraction contains 3.9 wt. % sugar, but only 0.2 wt. % protein.

Constructive Example 4

For Constructive Example 4, the raw milk fractions in Table II can be used, and can be made lactose-free by treatment with lactase enzyme, or some fractions do not have any lactose due to its complete retention or flow through the membranes. A dairy composition containing 90 wt. % protein-rich fraction and 10 wt. % fat-rich fraction is blended to contain approximately 4.4 wt. % fat, 11.8 wt. % protein, 0.7 wt. % sugar (glucose/galactose), and 0.95 wt. % minerals. This dairy composition is subjected to UHT direct sterilization at a temperature of 138-142° C. for 1-6 seconds to form a sterilized composition. Separately, a second milk fraction containing 82 wt. % sugar-rich fraction (or a derivative thereof) and 18 wt. % mineral-rich fraction is blended to contain substantially no fat, 0.07 wt. % protein, 4 wt. % sugar (glucose/galactose), and 0.6 wt. % minerals. The second milk fraction is subjected to filter sterilization using ultrafiltration and/or microfiltration. Then, 43.6 wt. % of the sterilized composition and 56.4 wt. % of the sterilized second milk fraction are blended to produce a finished milk product containing approximately 2 wt. % fat, 5.2 wt. % protein, 2.5 wt. % sugar (glucose/galactose), and 0.75 wt. % minerals.

After storage for 24 hours after sterilization and blending to form the finished milk product, it is expected that the organoleptic properties of the finished milk product of Constructive Example 4 would be superior to that of Example 1 and comparable to that of Example 2, as shown in Table IV and Table V. The protein-rich fraction contains only 0.7 wt. % sugar and is UHT sterilized separately from a sugar-rich fraction. The second milk fraction contains 4 wt. % sugar, but only 0.07 wt. % protein, and is filter sterilized.

Constructive Example 5

For Constructive Example 5, the raw milk fractions in Table II can be used, and can be made lactose-free by treatment with lactase enzyme, or some fractions do not have any lactose due to its complete retention or flow through the membranes. The protein-rich fraction (13 wt. % protein, 0.5 wt. % sugar (glucose/galactose)) is subjected to UHT direct sterilization at a temperature of 138-142° C. for 1-6 seconds to form a sterilized protein-rich composition. Separately, a second milk fraction containing 91 wt. % sugar-rich fraction (or a derivative thereof) and 9 wt. % fat-rich fraction is blended to contain approximately 3.5 wt. % fat, 0.2 wt. % protein, 4.6 wt. % sugar (glucose/galactose), and 0.5 wt. % minerals. The second milk fraction is subjected to UHT direct sterilization at a temperature of 138-142° C. for 1-6 seconds to form a sterilized second milk fraction. Separately, a third milk fraction containing a mineral-rich fraction (0.75 wt. % minerals) is subjected to filter sterilization using ultrafiltration and/or microfiltration (or alternatively, UHT indirect sterilization at a temperature of 138-142° C. for 1-6 seconds). Then, 39 wt. % of the sterilized protein-rich composition, 50 wt. % of the sterilized second milk fraction, and 11 wt. % of the sterilized third milk fraction are blended to produce a finished milk product containing approximately 2 wt. % fat, 5.2 wt. % protein, 2.5 wt. % sugar (glucose/galactose), and 0.75 wt. % minerals.

After storage for 24 hours after sterilization and blending to form the finished milk product, it is expected that the organoleptic properties of the finished milk product of Constructive Example 5 would be superior to that of Example 1 and comparable to that of Example 2, as shown in Table IV and Table V. The protein-rich fraction contains only 0.5 wt. % sugar and is UHT sterilized separately from a sugar-rich fraction. The second milk fraction contains 4.6 wt. % sugar, but only 0.2 wt. % protein, and the third milk fraction is filter sterilized.

TABLE I

Composition of the raw milk fractions used for making a comparative milk composition (Example 1).

| | Fat (wt. %) | Protein (wt. %) | Sugar (wt. %) | Minerals (wt. %) | Total Solids (wt. %) |
|---|---|---|---|---|---|
| Sugar-rich fraction | 0.01 | 0.08 | 4.80 | 0.55 | 6.00 |
| Milk protein-rich fraction | 0.48 | 12.78 | 0.51 | 1.00 | 15.71 |
| Milk fat-rich fraction | 41.52 | 1.67 | 2.57 | 0.55 | 46.31 |
| Milk mineral-rich fraction | 0.01 | 0.01 | 0.50 | 0.75 | 1.30 |

TABLE II

Composition of the raw milk fractions after ultra-pasteurization heat treatment and used for making an inventive milk composition (Example 2).

| | Fat (wt. %) | Protein (wt. %) | Sugar (wt. %) | Minerals (wt. %) | Total Solids (wt. %) |
|---|---|---|---|---|---|
| Sugar-rich fraction | 0.01 | 0.08 | 4.80 | 0.55 | 6.00 |
| Milk protein-rich fraction | 0.48 | 13.03 | 0.51 | 1.00 | 15.50 |
| Milk fat-rich fraction | 39.45 | 1.79 | 2.57 | 0.55 | 45.57 |
| Milk mineral-rich fraction | 0.01 | 0.01 | 0.50 | 0.75 | 1.30 |

TABLE III

Blends of Milk Fractions to Produce the Milk Products of Examples 1-2.

| Ingredient | Example 1 | Example 2 |
|---|---|---|
| Milk protein-rich fraction (wt. %) | 41.0 | 40.2 |
| Sugar-rich fraction (wt. %) | 45.2 | 45.2 |
| Milk fat-rich fraction (wt. %) | 4.1 | 4.3 |
| Milk mineral-rich fraction (wt. %) | 9.7 | 10.3 |

TABLE IV

Organoleptic Comparison of the Milk Products of Examples 1-2.

| Sensory Test | Example 1 | Example 2 |
|---|---|---|
| Appearance | 10 | 10 |
| Color | 10 | 10 |
| Body | 8 | 10 |
| Texture | 7 | 10 |
| Taste | 7 | 10 |
| Eggy Smell | 3 | 8 |
| Flavor - Astringent | 10 | 10 |
| Flavor - Caramelized | 10 | 10 |
| Flavor - Cooked | 2 | 8 |
| Flavor - Flat | 5 | 9 |
| Flavor - Freshness | 10 | 10 |
| Flavor - Oxidized | 10 | 10 |
| Flavor - Rancid | 10 | 10 |
| Flavor - Salty | 10 | 10 |
| Flavor - Sulfur | 3 | 9 |
| Overall | 6 | 9 |

TABLE V

Color Comparison of the Milk Products of Examples 1-2.

| | L* | a* | b* |
|---|---|---|---|
| Example 1 | 95.39 | −3.79 | 7.61 |
| Example 2 | 93.04 | −3.40 | 6.25 |

We claim:

1. A process to reduce cooked flavor, sulfur odor, and/or brown color of a finished milk product, the process comprising:
   (a) subjecting a dairy composition comprising a protein-rich fraction to UHT sterilization to form a sterilized protein-rich composition, wherein the dairy composition comprises from about 8 to about 14 wt. % protein;
   (b) subjecting a second milk fraction comprising a fat-rich fraction and milk sugar-rich fraction or a derivative thereof to UHT sterilization to form a sterilized second milk fraction, wherein the second milk fraction comprises:
      from about 0.2 to about 8 wt. % fat; and
      from about 2 to about 8 wt. % milk sugar;
   (c) subjecting a third milk fraction comprising a mineral-rich fraction to a sterilization process to form a sterilized third milk fraction, wherein the third milk fraction comprises from about 0.4 to about 2 wt. % minerals; and
   (d) combining the sterilized protein-rich composition, the sterilized second milk fraction, and the sterilized third milk fraction to form the finished milk product.

2. The process of claim 1, wherein the sterilization process in step (c) is UHT sterilization conducted using indirect heating or filter sterilization conducted using ultrafiltration and/or microfiltration.

3. The process of claim 1, wherein:
   the second milk fraction and/or the third milk fraction further comprise(s) a milk water fraction;
   step (d) further comprises the addition of one or more ingredients to form the finished milk product;
   the finished milk product is whole milk, low-fat milk, skim milk, buttermilk, flavored milk, low lactose milk, high protein milk, lactose-free milk, ultra-filtered milk, micro-filtered milk, concentrated milk, evaporated milk, or high protein, high calcium, and reduced sugar milk; and
   the finished milk product produced by the process has less cooked flavor, sulfur odor, and/or brown color than that of a finished milk product obtained by the UHT sterilization of an unpasteurized milk product containing all the milk fractions together, under the same processing conditions and with the same milk component amounts.

4. A process to reduce cooked flavor, sulfur odor, and/or brown color of a finished milk product, the process comprising:
(a) subjecting a dairy composition comprising a protein-rich fraction to UHT sterilization to form a sterilized protein-rich composition, wherein the dairy composition comprises:
from about 5 to about 20 wt. % protein; and
less than about 0.75 wt. % milk sugar;
(b) subjecting a second milk fraction comprising a fat-rich fraction and milk sugar-rich fraction or a derivative thereof to UHT sterilization to form a sterilized second milk fraction, wherein the second milk fraction comprises:
from about 0.1 to about 15 wt. % fat;
from about 1 to about 12 wt. % milk sugar; and
less than about 1 wt. % protein;
(c) subjecting a third milk fraction comprising a mineral-rich fraction to a sterilization process to form a sterilized third milk fraction, wherein the third milk fraction comprises from about 0.1 to about 8 wt. % minerals; and
(d) combining the sterilized protein-rich composition, the sterilized second milk fraction, and the sterilized third milk fraction to form the finished milk product.

5. The process of claim 4, wherein the sterilization process in step (c) is UHT sterilization conducted using indirect heating.

6. The process of claim 4, wherein the sterilization process in step (c) is filter sterilization conducted using ultrafiltration and/or microfiltration.

7. A process to reduce cooked flavor, sulfur odor, and/or brown color of a finished milk product, the process comprising:
(a) subjecting a dairy composition comprising a protein-rich fraction to UHT sterilization to form a sterilized protein-rich composition, wherein the dairy composition comprises:
from about 3 to about 14 wt. % protein; and
less than about 0.75 wt. % milk sugar;
(b) subjecting a second milk fraction comprising a fat-rich fraction and milk sugar-rich fraction or a derivative thereof to UHT sterilization to form a sterilized second milk fraction, wherein the second milk fraction comprises:
from about 0.2 to about 10 wt. % fat;
from about 1 to about 5 wt. % milk sugar; and
less than about 0.75 wt. % protein;
(c) subjecting a third milk fraction comprising a mineral-rich fraction to a sterilization process to form a sterilized third milk fraction, wherein the third milk fraction comprises from about 0.2 to about 3 wt. % minerals; and
(d) combining the sterilized protein-rich composition, the sterilized second milk fraction, and the sterilized third milk fraction to form the finished milk product.

8. The process of claim 7, wherein the sterilization process in step (c) is UHT sterilization conducted using indirect heating.

9. The process of claim 7, wherein the sterilization process in step (c) is filter sterilization conducted using ultrafiltration and/or microfiltration.

10. The process of claim 1, wherein step (d) further comprises the addition of one or more ingredients to form the finished milk product.

11. The process of claim 1, wherein step (d) is conducted aseptically at a temperature in a range from about 5 to about 50° C.

12. The process of claim 1, wherein the finished milk product is whole milk, low-fat milk, skim milk, buttermilk, flavored milk, low lactose milk, high protein milk, lactose-free milk, ultra-filtered milk, micro-filtered milk, concentrated milk, evaporated milk, or high protein, high calcium, and reduced sugar milk.

13. The process of claim 1, wherein the finished milk product produced by the process has less cooked flavor, sulfur odor, and/or brown color than that of a finished milk product obtained by the UHT sterilization of an unpasteurized milk product containing all the milk fractions together, under the same processing conditions and with the same milk component amounts.

14. The process of claim 1, wherein:
UHT sterilization is conducted at a temperature in a range from about 135° C. to about 145° C. for a time period in a range from about 1 to about 10 sec; and
UHT sterilization is conducted using indirect heating, direct heating, direct steam injection, direct steam infusion, a hybrid of direct and indirect heating, or combinations thereof.

15. The process of claim 1, wherein the sterilization process in step (c) is UHT sterilization conducted using indirect heating.

16. The process of claim 1, wherein the sterilization process in step (c) is filter sterilization conducted using ultrafiltration and/or microfiltration.

\* \* \* \* \*